US012580282B2

(12) United States Patent
Fortini et al.

(10) Patent No.: US 12,580,282 B2
(45) Date of Patent: Mar. 17, 2026

(54) METHOD TO PRODUCE A BATTERY FOR ENERGY STORAGE

(71) Applicant: G.D S.p.A., Bologna (IT)

(72) Inventors: Massimo Fortini, Bologna (IT); Giacomo Noferini, Bologna (IT); Ivan Eusepi, Bologna (IT)

(73) Assignee: G.D S.p.A., Bologna (IT)

( * ) Notice: Subject to any disclaimer, the term of this patent is extended or adjusted under 35 U.S.C. 154(b) by 0 days.

(21) Appl. No.: 18/835,407

(22) PCT Filed: Dec. 21, 2022

(86) PCT No.: PCT/IB2022/062573
§ 371 (c)(1),
(2) Date: Aug. 2, 2024

(87) PCT Pub. No.: WO2023/148546
PCT Pub. Date: Aug. 10, 2023

(65) Prior Publication Data
US 2025/0141067 A1 May 1, 2025

(30) Foreign Application Priority Data
Feb. 3, 2022 (IT) ........................ 102022000001838

(51) Int. Cl.
*B23K 9/00* (2006.01)
*H01M 50/00* (2021.01)
(Continued)

(52) U.S. Cl.
CPC ....... *H01M 50/566* (2021.01); *H01M 50/536* (2021.01); *H01M 50/567* (2021.01)

(58) Field of Classification Search
CPC ............. H01M 50/566; H01M 50/536; H01M 50/567; H01M 50/105; H01M 50/152;
(Continued)

(56) References Cited

U.S. PATENT DOCUMENTS

| 6,117,586 A | 9/2000 | Kim et al. |
| 10,637,037 B2 | 4/2020 | Li et al. |
| (Continued) | | |

FOREIGN PATENT DOCUMENTS

| CN | 106575741 A | 4/2017 |
| CN | 209200018 U | 8/2019 |
| (Continued) | | |

OTHER PUBLICATIONS

ISR issued by ISA/EPO in connection with PCT/IB2022/062573 dated Mar. 15, 2023, 3 pages.
(Continued)

*Primary Examiner* — Kiley S Stoner
(74) *Attorney, Agent, or Firm* — Levenfeld Pearlstein, LLC

(57) ABSTRACT

Method to manufacture an energy storage battery having the steps of: providing an electrochemical cell, which is at least partially complete and is provided with an electrical collector; providing a container having a first wall; placing, on an outer surface of the first wall, an outer body, which constitutes an electrical pole of the battery; and inserting the electrochemical cell into the container placing the electrical collector close to the first wall; providing the electrical collector with an access from the outside of the container in order to permit a weld between the electrical collector and the outer body in order to establish an electrical connection; welding the electrical collector and the outer body together through the aforementioned access in order to establish an electrical connection.

12 Claims, 17 Drawing Sheets

(51) Int. Cl.

| | |
|---|---|
| *H01M 50/536* | (2021.01) |
| *H01M 50/566* | (2021.01) |
| *H01M 50/567* | (2021.01) |

(58) Field of Classification Search

CPC ............. H01M 50/179; H01M 50/188; H01M 10/052; H01M 50/561; H01M 10/0422; H01M 2220/10; Y02E 60/10; Y02P 70/50

See application file for complete search history.

(56) References Cited

U.S. PATENT DOCUMENTS

| | | | | |
|---|---|---|---|---|
| 2008/0038632 | A1 | 2/2008 | Hamada et al. | |
| 2016/0126534 | A1* | 5/2016 | Lee ..................... | H01M 50/528 |
| | | | | 429/61 |
| 2016/0181577 | A1* | 6/2016 | Kajiwara ............ | H01M 50/562 |
| | | | | 429/179 |
| 2017/0117575 | A1 | 4/2017 | DeWulf et al. | |
| 2018/0358605 | A1 | 12/2018 | Li et al. | |
| 2020/0242753 | A1* | 7/2020 | Shibata ................ | B23K 26/323 |
| 2020/0287175 | A1 | 9/2020 | Wells | |
| 2021/0399367 | A1 | 12/2021 | Palazzo et al. | |
| 2023/0006289 | A1* | 1/2023 | Cho ..................... | H01M 50/548 |
| 2023/0155224 | A1* | 5/2023 | You ..................... | H01M 50/172 |
| | | | | 429/181 |
| 2024/0234974 | A1* | 7/2024 | Kim ..................... | H01M 50/559 |
| 2025/0141068 | A1* | 5/2025 | Fortini ................ | H01M 50/188 |

FOREIGN PATENT DOCUMENTS

| | | | | | |
|---|---|---|---|---|---|
| CN | 110800131 | A | * | 2/2020 | ......... H01M 50/533 |
| CN | 113991186 | A | | 1/2022 | |
| CN | 117832772 | A | * | 4/2024 | ......... H01M 50/176 |
| DE | 102012212256 | A1 | * | 1/2014 | ......... H01M 50/531 |
| EP | 2071646 | A1 | | 6/2009 | |
| EP | 3018734 | A1 | | 5/2016 | |
| JP | H09153367 | A | * | 6/1997 | |
| JP | H11176414 | A | * | 7/1999 | |
| JP | 2001155710 | A | * | 6/2001 | |
| JP | 2002352789 | A | * | 12/2002 | |
| JP | 2016103412 | A | * | 6/2016 | |
| JP | 2018160405 | A | * | 10/2018 | |
| JP | 2019109972 | A | * | 7/2019 | ......... H01M 50/528 |
| KR | 20090032997 | A | * | 4/2009 | ......... H01M 50/566 |
| KR | 20120024503 | A | * | 3/2012 | ......... H01M 50/176 |
| KR | 20230024376 | A | * | 2/2023 | ............. H01M 6/14 |
| WO | WO-2023148549 | A1 | * | 8/2023 | ......... H01M 50/531 |
| WO | WO-2024057631 | A1 | * | 3/2024 | ......... H01M 50/566 |

OTHER PUBLICATIONS

Written Opinion issued by ISA/EPO in connection with PCT/IB2022/062573 dated Mar. 15, 2023, 6 pages.

ISR issued by ISA/EPO in connection with PCT/IB2022/062578 dated Mar. 24, 2023, 3 pages.

Written Opinion issued by ISA/EPO in connection with PCT/IB2022/062578 dated Mar. 24, 2023, 6 pages.

ISR issued by ISA/EPO in connection with PCT/IB2022/062582 dated Apr. 5, 2023, 3 pages.

Written Opinion issued by ISA/EPO in connection with PCT/IB2022/062582 dated Apr. 5, 2023, 5 pages.

ISR issued by ISA/EPO in connection with PCT/IB2022/062586 dated Apr. 5, 2023, 3 pages.

Written Opinion issued by ISA/EPO in connection with PCT/IB2022/062586 dated Apr. 5, 2023, 6 pages.

ISR issued by ISA/EPO in connection with PCT/IB2022/062605 dated Apr. 17, 2023, 4 pages.

Written Opinion issued by ISA/EPO in connection with PCT/IB2022/062605 dated Apr. 17, 2023, 7 pages.

* cited by examiner

METHOD TO PRODUCE A BATTERY FOR ENERGY STORAGE

CROSS-REFERENCE TO RELATED APPLICATION DATA

This application is a U.S. National Stage Application of International Application No. PCT/IB2022/062573, filed Dec. 21, 2022, which claims the benefit of and priority to Italian Patent Application No. 102022000001838, filed Feb. 3, 2022, the disclosure of each is incorporated herein by reference in its entirety.

TECHNICAL FIELD

The present invention relates to a method of producing a battery for energy storage, that is, more generally, to a device for energy storage.

The meaning of "production of a battery" also refers to the assembly thereof.

The present invention finds advantageous application to the production of a lithium-ion cylindrical battery, to which the following description will explicitly refer without thereby losing generality.

BACKGROUND OF THE INVENTION

Commercial lithium-ion batteries are assembled in three different geometries: cylindrical, prismatic and bag-like.

The cylindrical batteries are formed by a metal container of cylindrical shape with inside a single electrochemical cell of the "jelly-roll" or "Swiss-roll" type, formed by an anode, separator and cathode which are wound together around a central pin.

In particular, the cylindrical container is at first open on one side (i.e. it has the shape of a cup having a first end which is closed and a second end which is open) to allow the insertion of the wound electrochemical cell and of the electrolyte that impregnates the wound electrochemical cell; once the formation of the battery has been completed (i.e. once all the components have been arranged inside the cylindrical container), the open end of the cylindrical container is closed making a sealed closure.

In particular, in order to close the open end of a cylindrical container, a circular lid (possibly coupled to an annular gasket) is used which is connected to the cylindrical container by deforming against the lid an upper rim of the cylindrical container itself.

Before inserting the electrochemical cell inside the cylindrical container, at the two opposite ends of the electrochemical cell, two electrical collectors are coupled (which are disc-shaped in the particular case of cylindrical batteries) at the cathode (in which an electrical collector made of aluminium is used) and at the anode (in which an electrical collector made of copper is used). Each electrical collector is pressed against the corresponding end of the electrochemical cell and is welded to connection lamellae of the conductive strips (made of aluminium and copper) which, wound together (with the interposition of insulating separators), constitute the electrochemical cell. The one first wall of the cylindrical container has centrally a through hole which is engaged by a rivet (called also rivet) made of aluminium having a head that is arranged on the outside of the cylindrical container and constitutes the positive pole of the cylindrical battery. In particular, the rivet is inserted through the through hole of the first wall of the cylindrical container with the interposition of a series of plastic gaskets that isolate the rivet from the cylindrical container and then the headless end of the rivet is bucked (i.e. plastically deformed) to form a counter-head. When the electrochemical cell provided with the two electrical collectors is inserted inside the cylindrical container, the electrical cathode collector (made of aluminium) is pressed against the counter-head of the rivet (previously coupled to the first wall of the cylindrical container) and then welded to the counter-head of the rivet in order to make a stable connection and of great extension (the greater the contact area, the lower the electrical resistance at the contact area).

Typically, the weld between the cathodic electrical collector and the counter-head of the rivet is made by using the central hole (of reduced dimensions) of the electrochemical cell to apply heat to the cathodic electrical collector and thus melt the metal (aluminium) locally; as a matter of fact, generally it is not possible to apply heat in the region between the cathodic electrical collector and the counter-head of the rivet passing from the first wall of the cylindrical container as, by doing so, the plastic gaskets that isolate the rivet from the cylindrical container would be damaged due to excess heat.

SUMMARY OF THE INVENTION

The Applicant has felt the need to provide a method to produce a battery for energy storage which allows to operate at a high production speed (measured as batteries produced per unit time) while at the same time guaranteeing the achievement of a high-quality end product.

The Applicant has first of all observed that the geometric proportions between a conventional electrochemical cell and the relative central hole make it uneasy to perform the weld through the central hole itself, especially at high production speeds. In particular, it is complex to apply, for example, heat to the bottom of this hole (i.e. at the cathodic electrical collector that is located at the end of the central hole of the electrochemical cell); as a result, the welding operation requires a high precision and proves to be particularly slow, hence it requires a very long execution time and does not allow to operate at a high production speed (measured as cylindrical batteries produced per unit time).

The Applicant has also observed that possible metal splashes generated during welding, (which by cooling down form small metal debris), remain trapped inside the hole of the jelly roll, or in any case inside the battery, being therefore able to "contaminate" the electrochemical cell, by giving rise to small local short circuits, which over time can impair the performance thereof or even cause it to degrade prematurely.

The Applicant has finally observed that the conventional weld through the hole of the jelly roll is difficult to inspect once it has been performed, making the subsequent quality controls difficult, or very slow, both in line and on the finished product.

The Applicant has therefore understood that an access, even temporary, from the outside of the container of the battery during welding allows to eliminate the presence of metal debris from the inside of the container, also facilitates the insertion at high speed of the welding head which does not find obstacles in its path, and it therefore allows operating at high speed while maintaining the quality of the end product.

Thus, in accordance with the present invention there is provided a method to manufacture an energy storage battery, the method comprising the steps of:

providing an electrochemical cell, which is at least partially complete and is provided with an electrical collector;

providing a container having a first wall;

placing, on an outer surface of the first wall, an outer body, which constitutes an electrical pole of the battery;

inserting the electrochemical cell into the container bringing the electrical collector close to the first wall;

providing the electrical collector with an access from the outside of the container in order to permit a weld between the electrical collector and the outer body, and welding the electrical collector and the outer body to one another at said access to establish an electrical connection.

Preferably, the access from the outside comprises a first through hole made in the first wall of the container.

Preferably, the access comprises a second hole made in the outer body and is arranged at least partially aligned with the first hole when the outer body is arranged on the outer surface of the first wall, wherein welding the electrical collector and the outer body to one another is made at the second hole.

Preferably, the weld is made from the outside of the container through the second hole and operating from the opposite side of the first wall relative to the electrochemical cell.

Preferably, the weld is at least partially arranged inside the second hole.

Preferably, the second hole is coaxial to the first hole when the outer body is arranged on the outer surface of the first wall.

Preferably, the second hole of the outer body is a through hole.

In embodiments, the electrical collector comprises a protrusion which is inserted into the first hole of the first wall of the container and into the second hole of the outer body, wherein the weld is made between the outer body and the protrusion of the electrical collector.

In embodiments, after having inserted the protrusion into the second hole, an outer surface of the protrusion is coplanar to an outer surface of the outer body.

In embodiments, an outer surface of the protrusion, after having inserted the protrusion into the second hole, at first projects from an outer surface of the outer body; the second central hole of the outer body has an outer flaring, and the method further comprises the step of at least partially bucking the outer surface of the protrusion against the outer body so as to make the outer surface of the protrusion coplanar to the outer surface of the outer body.

Preferably, a rivet is provided which engages the first hole of the first wall and comprises a head which is arranged on the outside of the container and constitutes the outer body, and a counter-head, which is arranged inside the container.

Preferably, the rivet has, at first, only the head, whereas the counter-head is obtained after having inserted the rivet through the first hole of the first wall by bucking the rivet against an inner surface of the first wall.

In embodiments, the outer body consists only of a connection element completely arranged on the outside of the container.

Preferably, the protrusion of the electrical collector is surrounded, at the base, by a fixing element having the function of compressing an insulating gasket against an inner surface of the first wall. In embodiments, the electrical collector has no protrusion and the weld is made inside the second hole of the outer body.

Preferably, the method comprises the further steps of:

placing a first insulating gasket inside the access in order to line the access;

placing a second insulating gasket between the outer body and an outer surface of the first wall; and placing a third insulating gasket between an inner surface of the first wall and the electrical collector.

The appended claims describe embodiments of the present invention forming an integral part thereof.

BRIEF DESCRIPTION OF THE DRAWINGS

The present invention will now be described with reference to the enclosed drawings, showing some non-limiting embodiments thereof, wherein.

DETAILED DESCRIPTION

Figure 1:
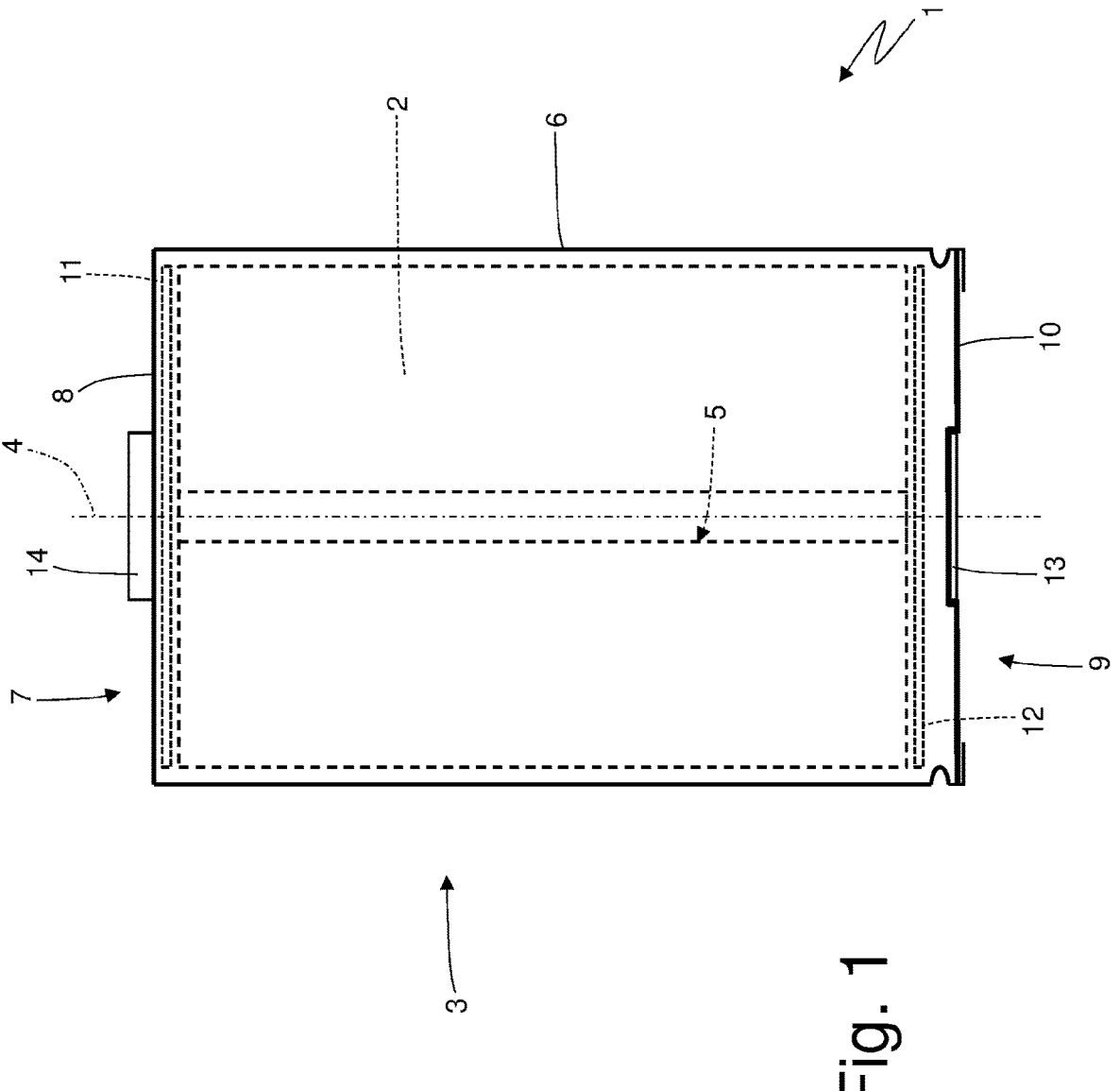
FIG. 1 is a schematic side view of a cylindrical battery.

In FIG. 1, the number 1 denotes as a whole an energy storage battery; the illustrated battery 1, by way of example only, is of cylindrical in shape, without thereby limiting the scope of the invention.

The battery 1 comprises an electrochemical cell 2 of cylindrical shape and of the "jelly-roll" or "Swiss-roll" type formed by several sheets superimposed and thus wound together so as to assume a cylindrical shape, and a cylindrical container 3 that encloses, on the inside, the electrochemical cell 2 and has a longitudinal axis 4 of symmetry which is arranged centrally. In particular, the cylindrical electrochemical cell 2 is made of a spiral winding of a set of four strips: a conductive strip of a metal-based material (typically aluminium) which constitutes the cathode, a separator strip made of a porous material (which is subsequently soaked with a liquid electrolyte), a conductive strip made of a metal-based material (typically copper) which constitutes the anode, and a separator strip made of a porous material (which is subsequently soaked with a liquid electrolyte). In other words, the four superimposed strips form a composite material (i.e., a "sandwich" of the four strips) that is spirally wound on itself so as to form the cylindrical electrochemical cell 2. The electrochemical cell 2 has centrally a through hole 5 (necessary for the realization of the spiral winding) that passes through it from side to side.

The container 3 has a side wall 6 cylindrical in shape, a first end 7 which is closed since the beginning by a first wall

8 (that is, by a lower part) which is seamlessly connected to the side wall 6, and a second end 9, which is opposite to the first end 7, is at first open to permit the insertion of the electrochemical cell 2 into the container 3 and is subsequently closed and sealed. In particular, at the second end 9 of the container 3 a lid 10 is arranged (which in the case of the cylindrical battery is circular) which closes the second end 9 (i.e. it constitutes an upper base of the container 3).

Before inserting the electrochemical cell 2 inside the container 3, at the two opposite ends of the electrochemical cell 2 two electrical collectors 11 and 12 are coupled (which in the specific case of the cylindrical battery are disc-shaped) at the cathode (in which an electrical aluminium collector 11 is used) and at the anode (in which an electrical copper collector 12 is used). Each terminal collector 11 or 12 constitutes an electrical collector (cathodic for the electrical collector 11 made of aluminium and anodic for the electrical collector 12 made of copper) which collects the electric currents that are generated inside the electrochemical cell 2 in order to permit to said electric currents to circulate externally of the electrochemical cell 2. Each terminal collector 11 or 12 is pressed against the corresponding end of the electrochemical cell 2 and is welded to connection lamellae of the conductive strips (made of aluminium and copper) which, wound together (with the interposition of insulating separators) constitute the electrochemical cell 2.

The battery 1 comprises a negative electrical pole 13 which is arranged at the second end 9 and is made in the lid 10 and a positive electrical pole 14 which is arranged (with adequate electrical insulation as will be described below) at the first wall 8.

In general, according to the present invention, the collector 11 is placed in communication with the outside of the container 3 by means of at least one access 15, 22, 26.

Figure 2:
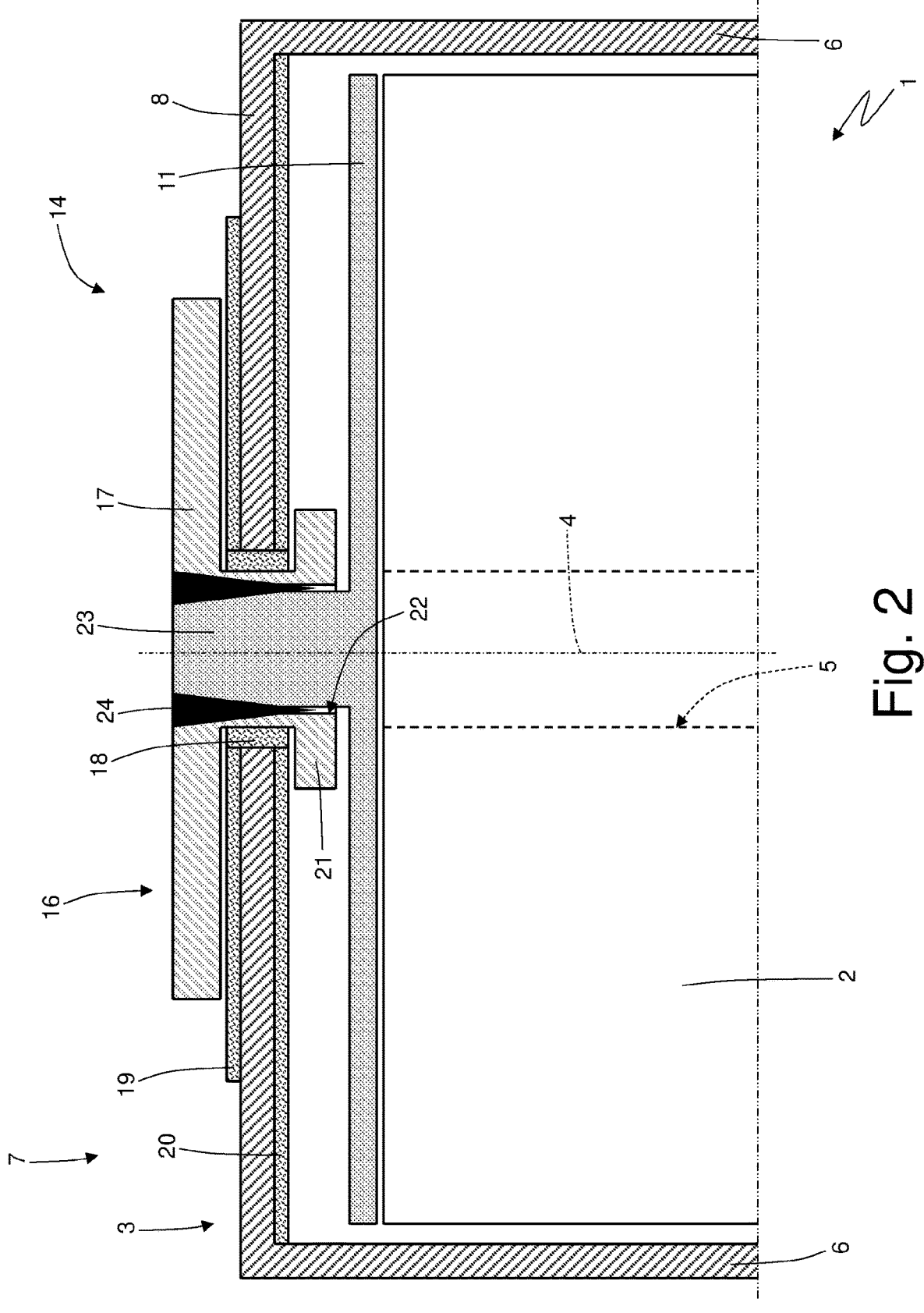
FIG. 2 is a schematic side view on an enlarged scale of a first end of the cylindrical battery of FIG. 1.

As illustrated in FIG. 2, the access comprises a hole 15. In particular, the first wall 8 of the container 3 has the through hole 15 (better illustrated in FIG. 5) (in this case central) which is engaged by a rivet 16 (also called rivet, see FIG. 7) made of aluminium having a head 17 that is arranged on the outside of the container 3 (i.e. on the outside of the first wall 8 of the container 3) and constitutes the positive electrical pole 14 of the battery 1 (i.e. the head 17 is a terminal that constitutes the positive electrical pole 14 of the battery 1).

In particular, the rivet 16 is inserted through the hole 15 of the first wall 8 of the container 3 with the interposition of a series of plastic insulating gaskets 18, 19 and 20 that isolate the rivet 16 from the container 3 (in particular from the first wall 8 of the container 3) and then the headless end of the rivet 16 is bucked (i.e. plastically deformed) to form a counter-head 21. In other words, the rivet 16 engages the through hole 15 of the first wall 8 of the container 3 and comprises: a head 17 which is arranged on the outside of the first wall 8 of the container 3 and constitutes the positive electrical pole 14 of the battery 1; and a counter-head 21 which is arranged inside the first wall 8 of the container 3 and is therefore facing the cathodic electrical collector 11.

The insulating gasket 18 has a cylindrical shape and internally lines the through hole 15 of the first wall 8 of the container 3, so as to isolate the rivet 16 from the walls of the hole 15.

The insulating gasket 19 has a disc shape and is interposed between the head 17 of the rivet 16 and the first wall 8 of the container 3 in order to isolate the rivet 16 from the outer surface of the first wall 8.

The insulating gasket 20 has a disc shape and is interposed between the counter-head 21 of the rivet 16 and the first wall

8 of the container 3 in order to isolate the rivet 16 from the inner surface of the first wall 8. In other words, the two insulating gaskets 19 and 20 are arranged on the opposite sides of the first wall 8 of the container 3.

The rivet 16 has centrally the hole 22 which in the illustrated example is a through hole and is cylindrical in shape and which passes through the rivet 16 from side to side, and the electrical collector 11 has a protrusion 23 (which in the illustrated example is arranged centrally and is cylindrical in shape) which rises cantilevered from the electrical collector 11; the hole 22 of the rivet 16 is engaged by the protrusion 23 of the electrical collector 11. Furthermore, the hole 22 is arranged at least partially aligned (and preferably coaxial) with the hole 15 when the head 17 is arranged on the outer surface of the first wall 8. In general, the protrusion fits into the access 15, 22, 25. In this case, the access also comprises the hole 22.

Figure 12:
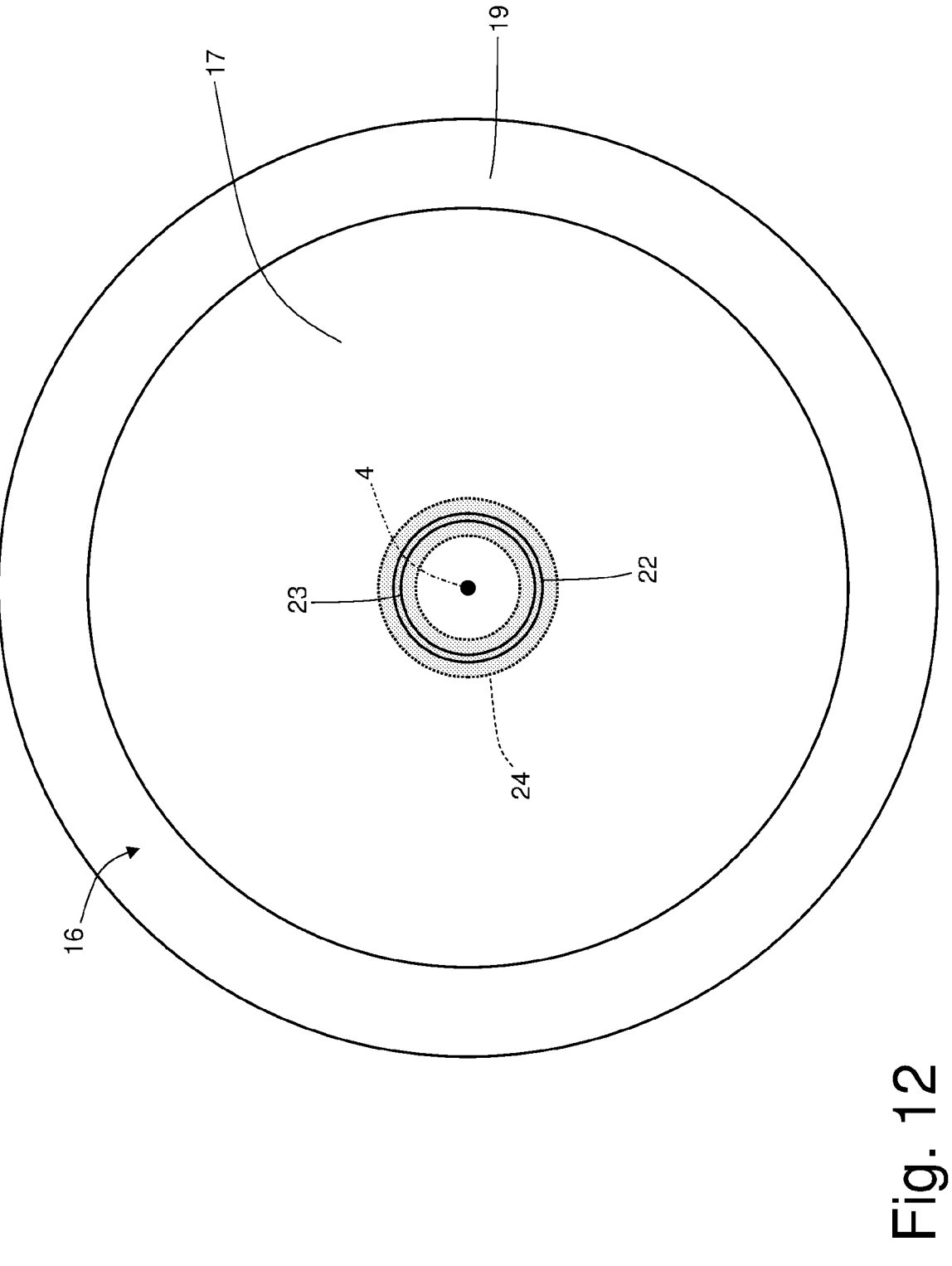
FIG. 12 is a schematic plan view of a first end of the cylindrical battery of FIG. 1.

Instead of the hole 22, the rivet 16 could alternatively comprise a recess (situation not illustrated). Preferably, the hole 22 of the rivet 16 houses the protrusion 23 of the electrical collector 11 with a reduced clearance, i.e. minimum clearance (a certain clearance is certainly necessary to allow the protrusion 23 of the electrical collector 11 to be inserted into the hole 22 of the rivet 16, but such clearance must be small in order to make it easier to subsequently make the joining between the protrusion 23 and the hole 22). Between the rivet 16 and the protrusion 23 of the electrical collector 11 there is a weld 24, preferably annular (i.e. forming a closed ring as illustrated in FIG. 12) which makes both a stable mechanical connection between the rivet 16 and the protrusion 23 of the electrical collector 11, and a low-resistance electrical connection between the rivet 16 and the protrusion 23 of the electrical collector 11.

The term weld generally refers to the result of the jointing/joining/fixing of elements together, regardless of the technique with which the operation takes place. For example, the jointing/joining/fixing can be by heat and/or mechanical pressure and/or vibrations; or it can result from a crimping or riveting of the parts to be joined. In embodiments the weld can be a melting between elements (with or without filler material), for example a laser weld (to which reference will be made below by way of example only) or an ultrasonic weld.

With reference to FIGS. 3-9, the methods to make the positive electrical pole 14 of the battery 1 are described below.

Figure 3:
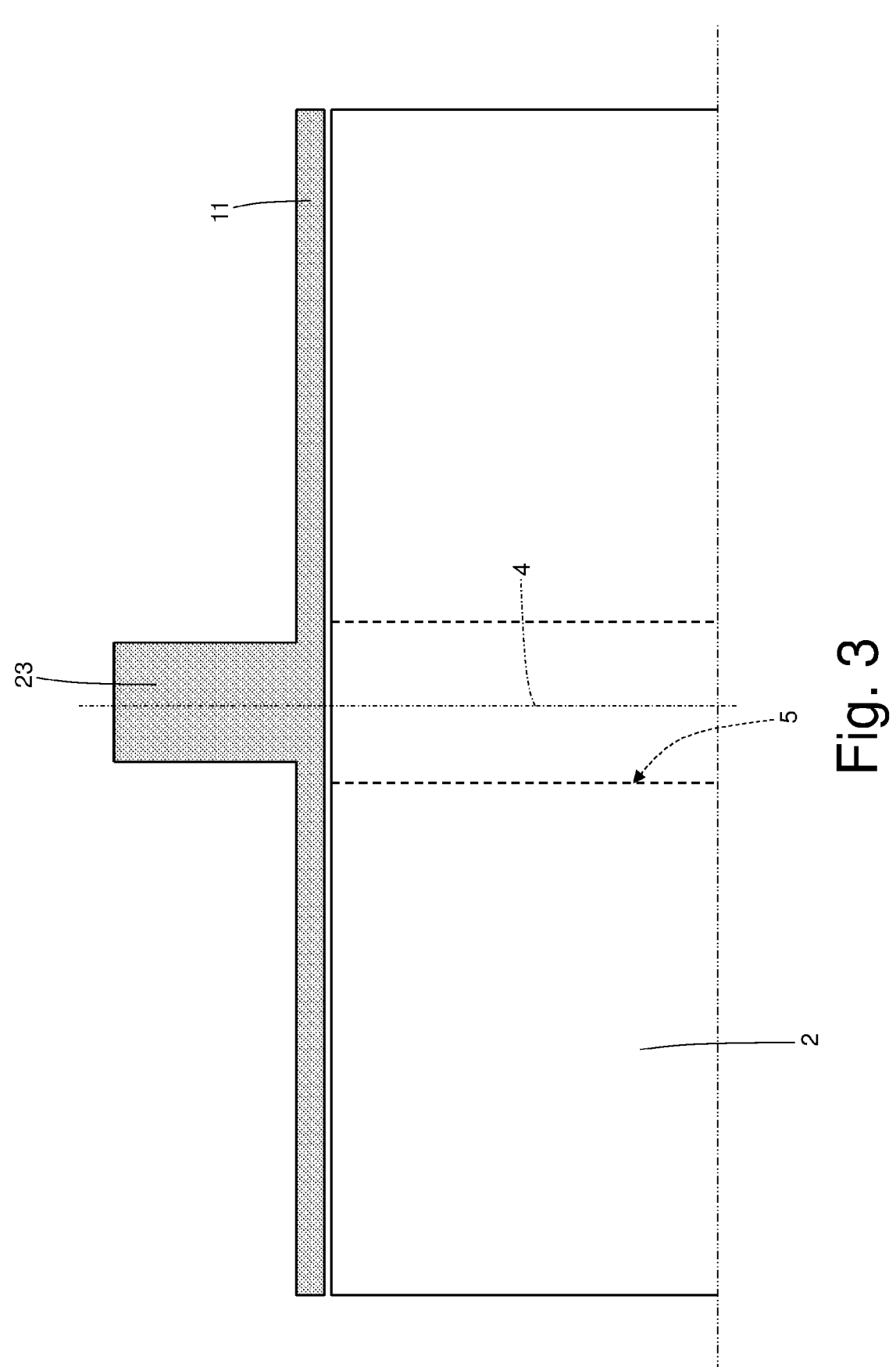
FIGS. 3-9 schematically illustrate a series of operations in order to make a positive pole of the cylindrical battery of FIG. 2.
Figure 4:
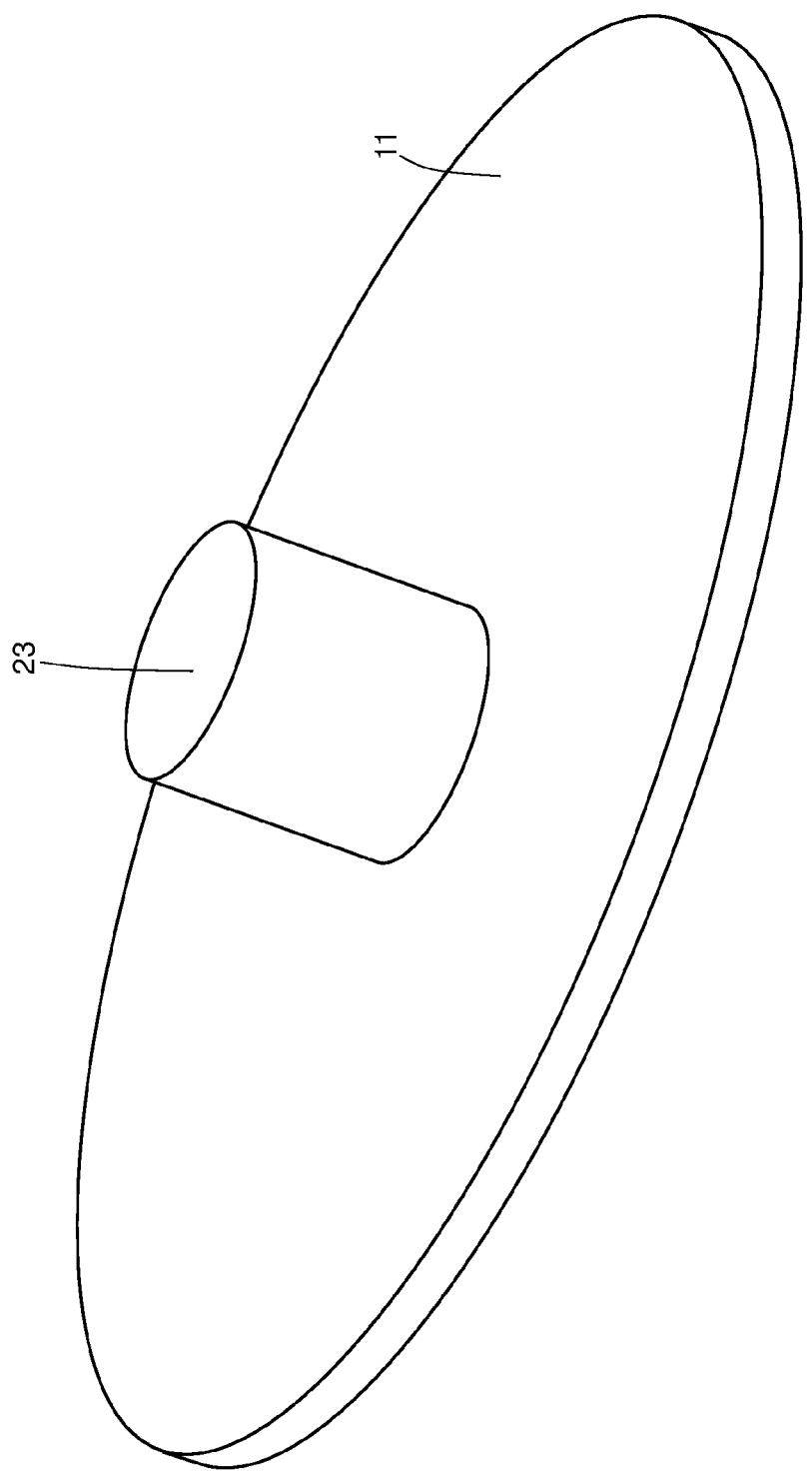

As illustrated in FIG. 3, the electrical collector 11 provided with the protrusion 23 is connected to the electrochemical cell 2; the electrical collector 11 provided with protrusion 23 is better illustrated in FIG. 4.

Figure 5:
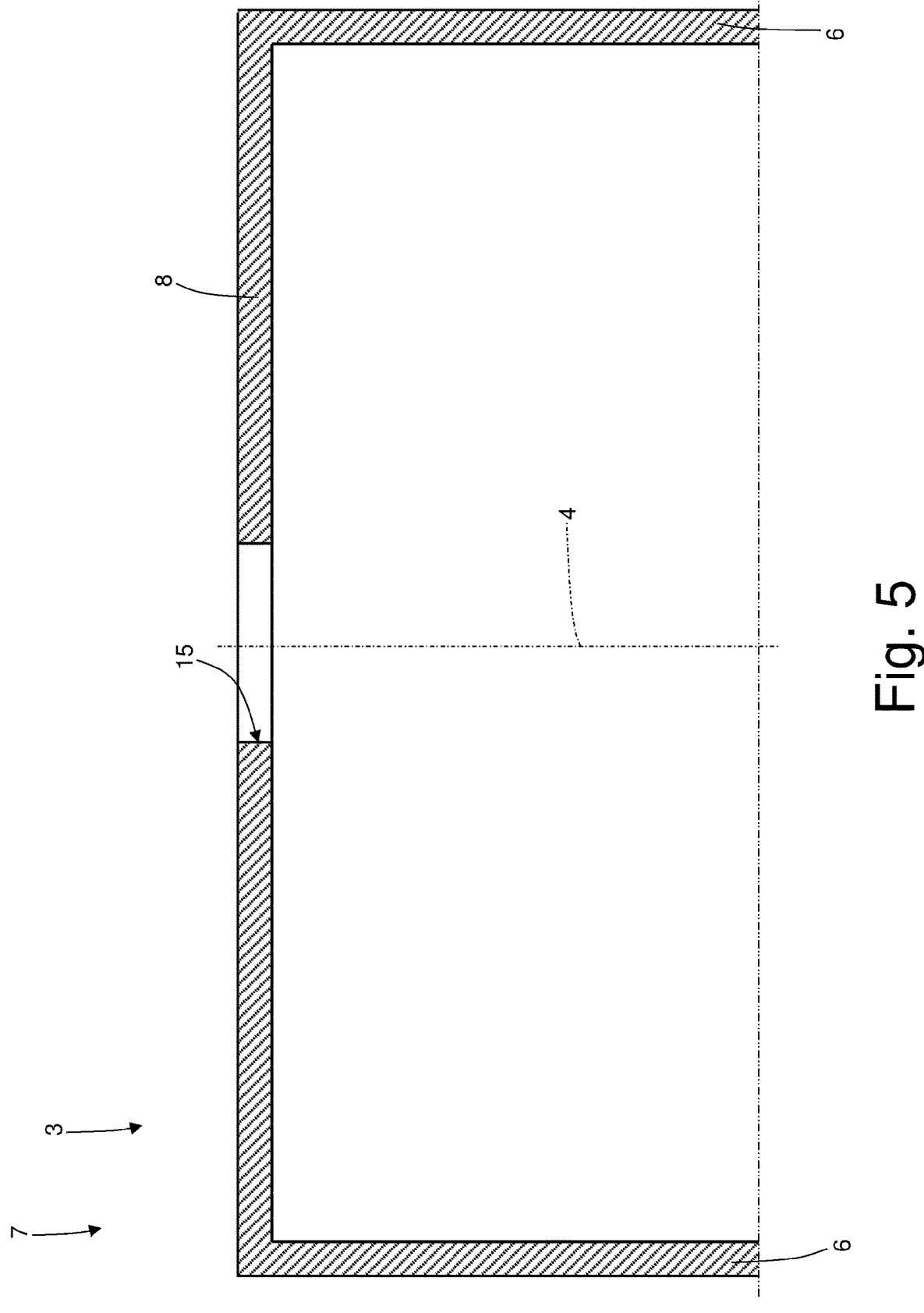

As illustrated in FIG. 5, the through hole 15 (which in the figures is central) is obtained through the first wall 8 of the container 3.

Figure 6:
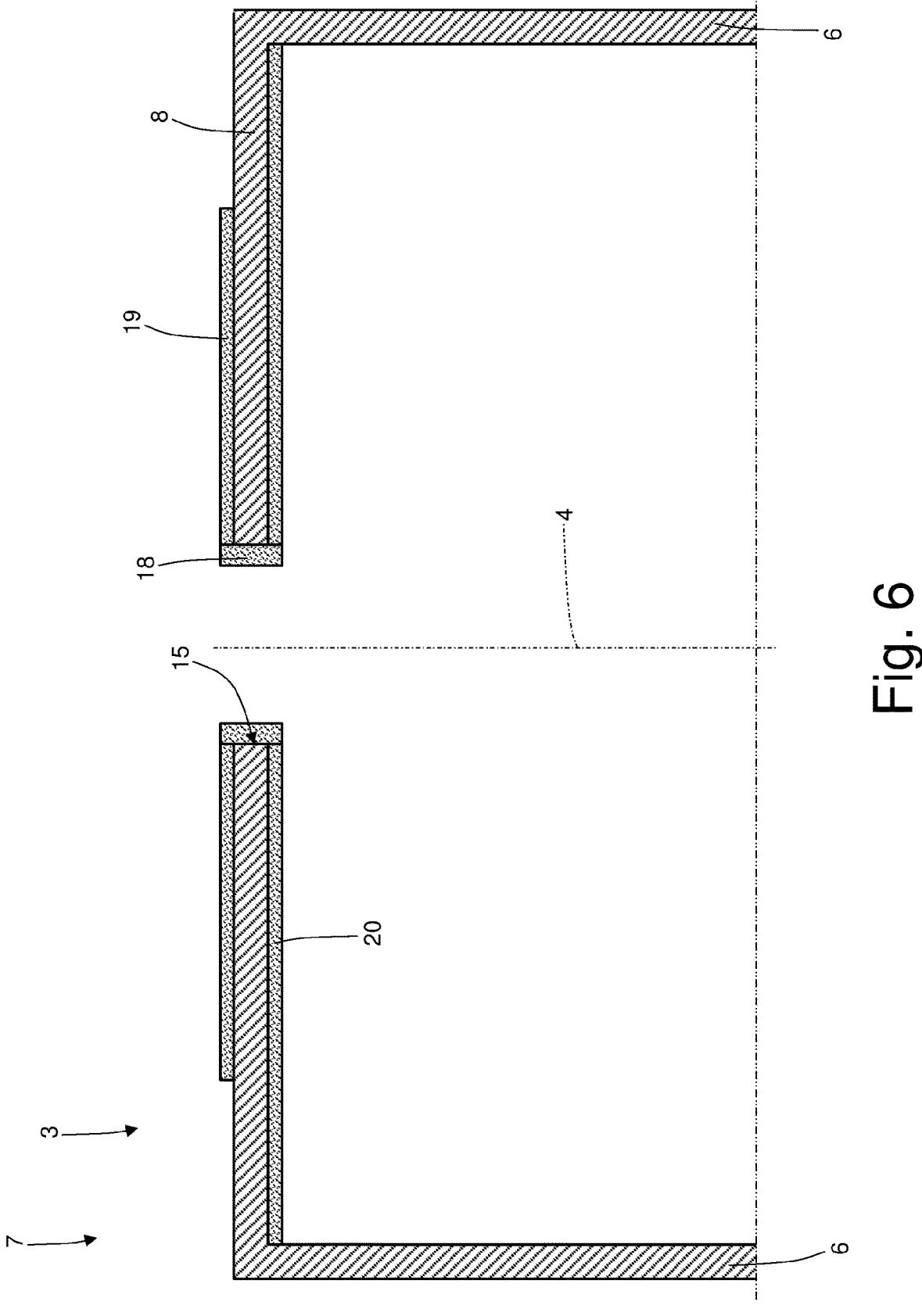

As illustrated in FIG. 6, the first wall 8 of the container 3 is coupled with the insulating gaskets 18, 19 and 20: the insulating gasket 18 in the illustrated example has a cylindrical shape and lines internally the through hole 15 of the first wall 8 of the container 3, the insulating gasket 19 in the illustrated example has a disc shape and is placed on the outer surface of the first wall 8, and the insulating gasket 20 in the illustrated example has a disc shape and lies on the inner surface of the first wall 8.

Figure 7:
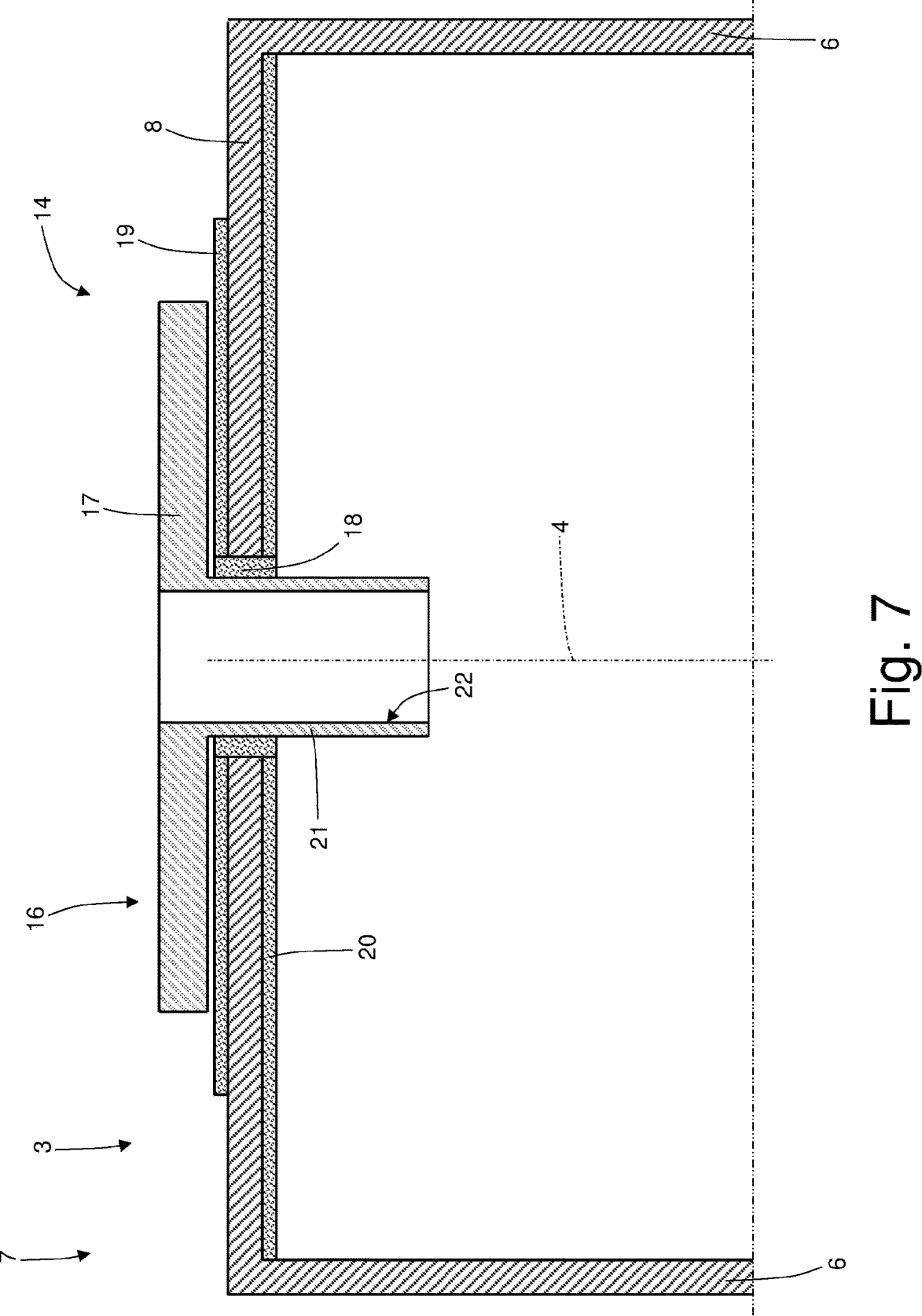
Figure 8:
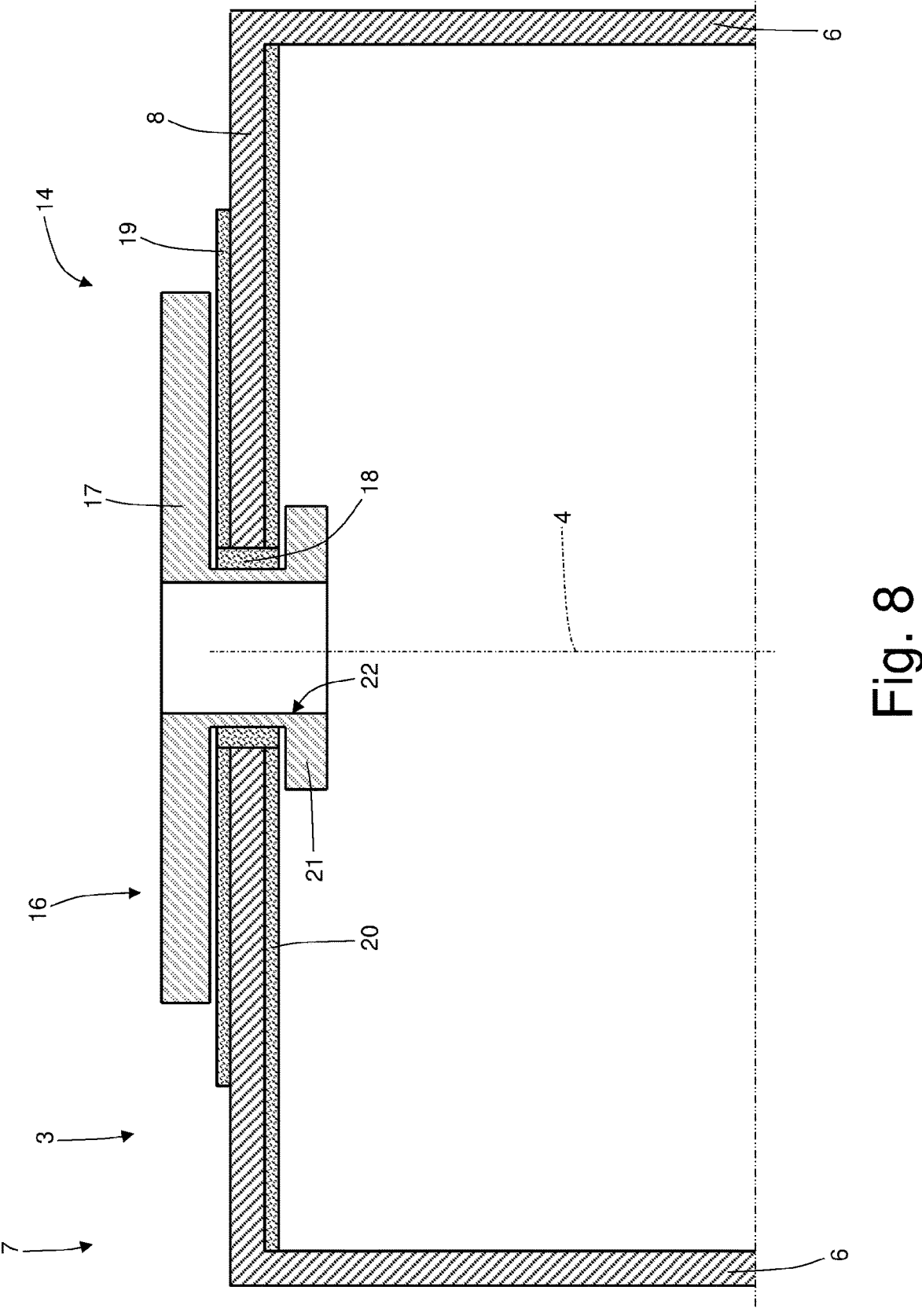

As illustrated in FIG. 7, after having coupled the insulating gaskets 18, 19 and 20 to the first wall 8 of the container 3, through the hole 15 of the first wall 8 of the container 3 the rivet 16 is placed having the head 17 which is arranged on the outside of the container 3 (i.e. on the outside of the first wall 8 of the container 3), constitutes the positive electrical pole 14 of the battery 1, and compresses the insulating gasket 19 against the first wall 8 of the container 3; in this way, the head 17 is arranged on an outer surface of the first wall 8 of the container 3. At this point and as illustrated in FIG. 8, the headless end of the rivet 16 is bucked (i.e. plastically deformed) in order to form the counter-head 21 which compresses the insulating gasket 20 against the first wall 8 of the container 3, in particular against an inner surface, opposite the aforementioned outer surface, of the first wall 8.

Figure 9:
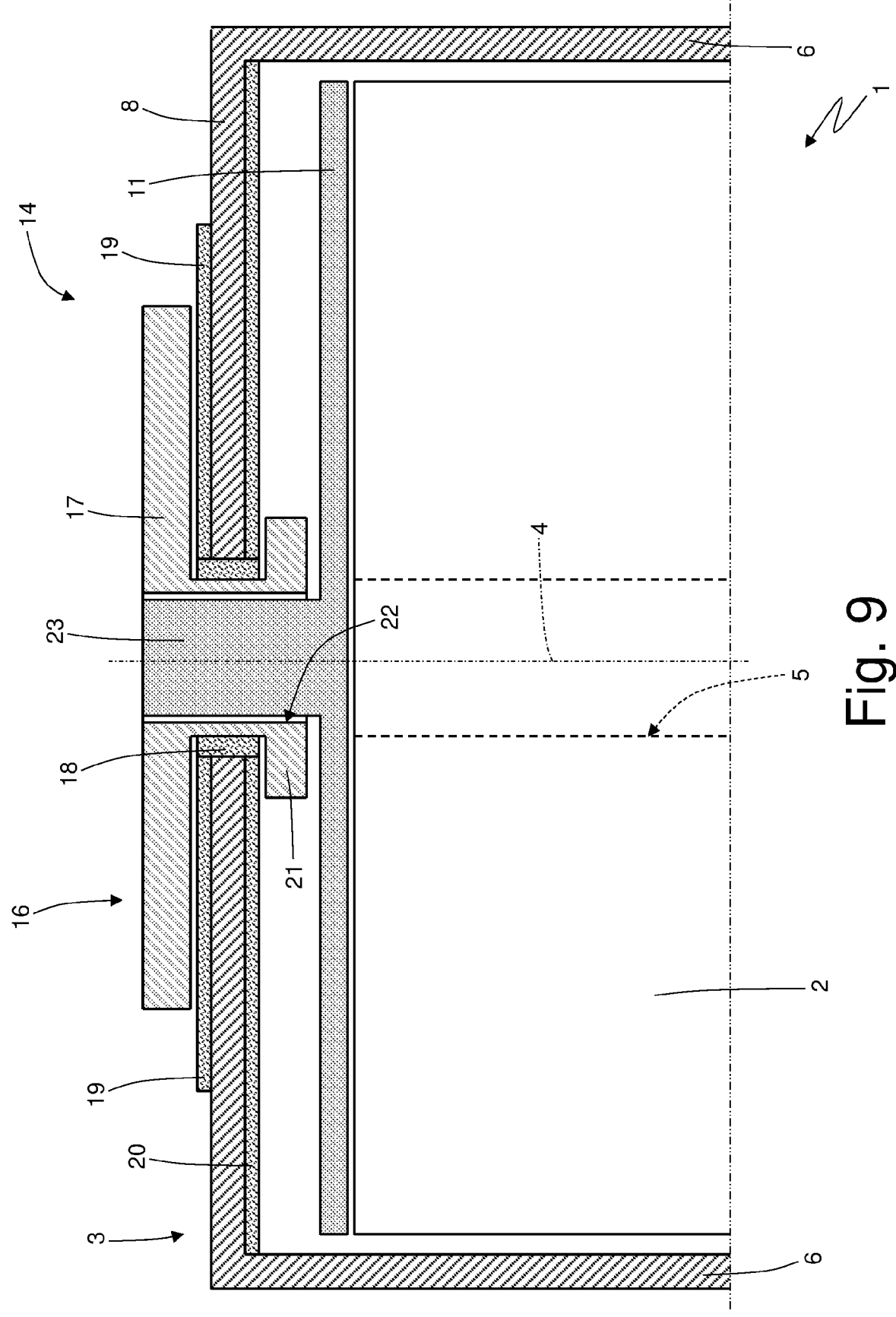

Subsequently, as illustrated in FIG. 9, the electrochemical cell 2 provided with the electrical collector 11, having (centrally) the protrusion 23 (which in the illustrated case is cylindrical) is inserted into the container 3; at the end of the insertion of the electrochemical cell 2, the protrusion 23 of the electrical collector 11 is inserted into the hole 22 of the rivet 16 by engaging the hole 22 itself. Once the insertion of the electrochemical cell 2 into the container 3 is finished, that is, once the insertion of the protrusion 23 of the electrical collector 11 into the hole 22 of the rivet 16 is finished, the weld 24 is made which connects the rivet 16 to the protrusion 23 of the electrical collector 11 in order to establish both a good mechanical connection and a good electrical connection.

It is important to note that the weld 24 (which in this case is annular) can be made from the outside of the container 3 and therefore without any kind of obstacle; consequently, the execution of the weld 24 can be completed quickly while still ensuring the achievement of a high overall quality. In essence, with the method according to the invention, the electrical collector 11 is (at least temporarily) placed in communication with the outside of the container (through the hole 15) and the weld 24 can thus be made from the outside of the container 3.

Figures 10, 11:
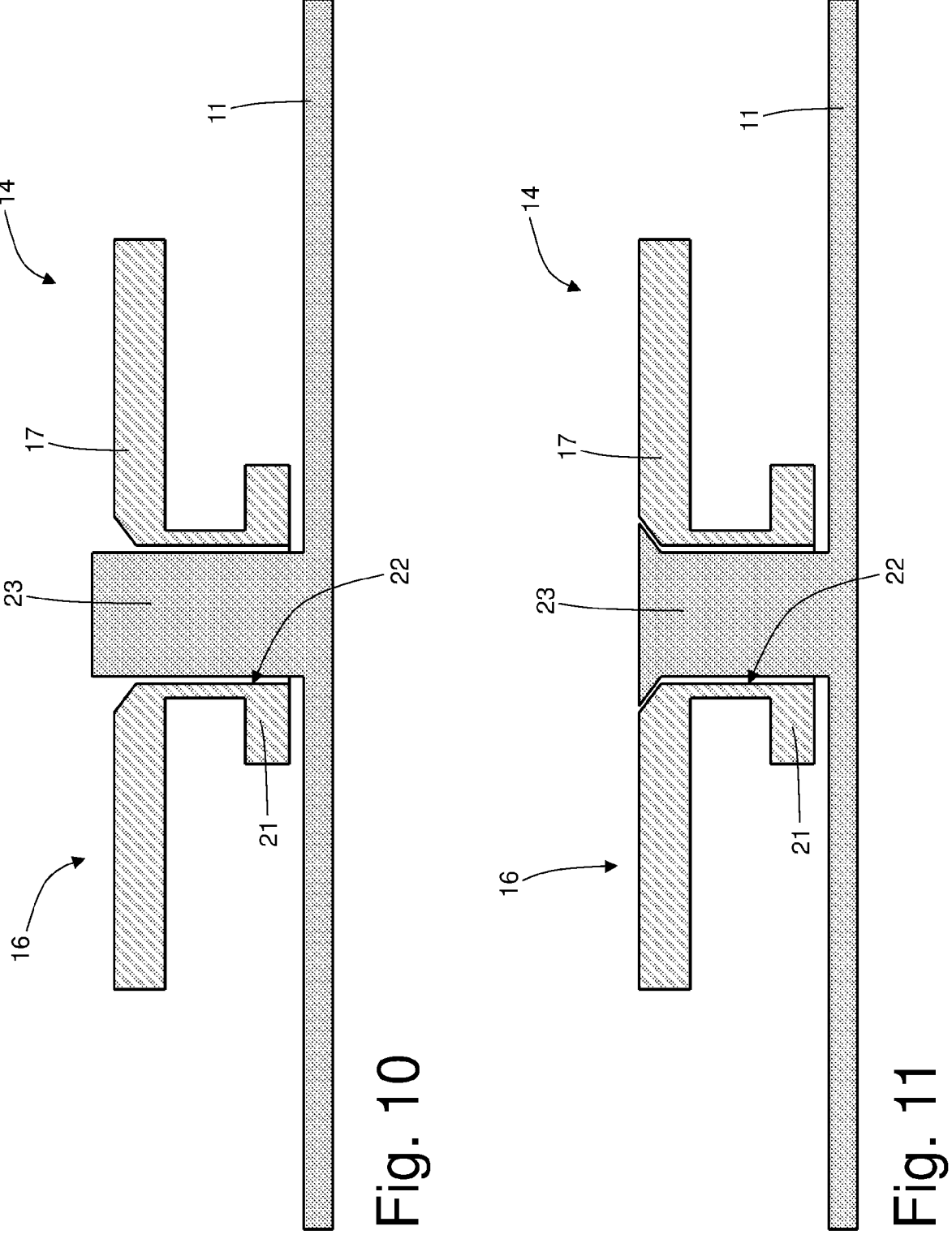
FIGS. 10 and 11 schematically illustrate a variant of some operations in order to make the positive pole of the cylindrical battery of FIG. 2.

In the embodiment illustrated in FIGS. 2-9, the outer surface of the protrusion 23 of the electrical collector 11 is from the beginning coplanar to the outer surface of the head 17 of the rivet 16; in other words, the outer surface of the protrusion 23 is coplanar to the outer surface of the head 17 of the rivet 16 once it has been inserted into the hole 22 (once the protrusion 23 is inserted into the hole 22). In this embodiment, the hole 22 of the rivet 16 and the protrusion 23 have a shape (which in the illustrated case is cylindrical) substantially complementary to each other (i.e. without flaring) (a shape coupling is generated between the two). According to the alternative embodiment illustrated in FIGS. 10 and 11, the outer surface of the cylindrical protrusion 23 of the electrical collector 11 at first projects from the outer surface of the head 17 of the rivet 16, that is, once the protrusion 23 is inserted into the hole 22 it projects from the aforementioned outer surface; in this embodiment, the hole 22 of the rivet 16 has an outer flaring. After having inserted the cylindrical protrusion 23 of the electrical collector 11 into the hole 22 of the rivet 16, the outer part of the protrusion 23 is bucked against the head 17 of the rivet 16 by means of a plastic deformation so as to make the outer surface of the protrusion 23 of the electrical collector 11 coplanar to the outer surface of the head 17 of the rivet 16.

Figure 13:
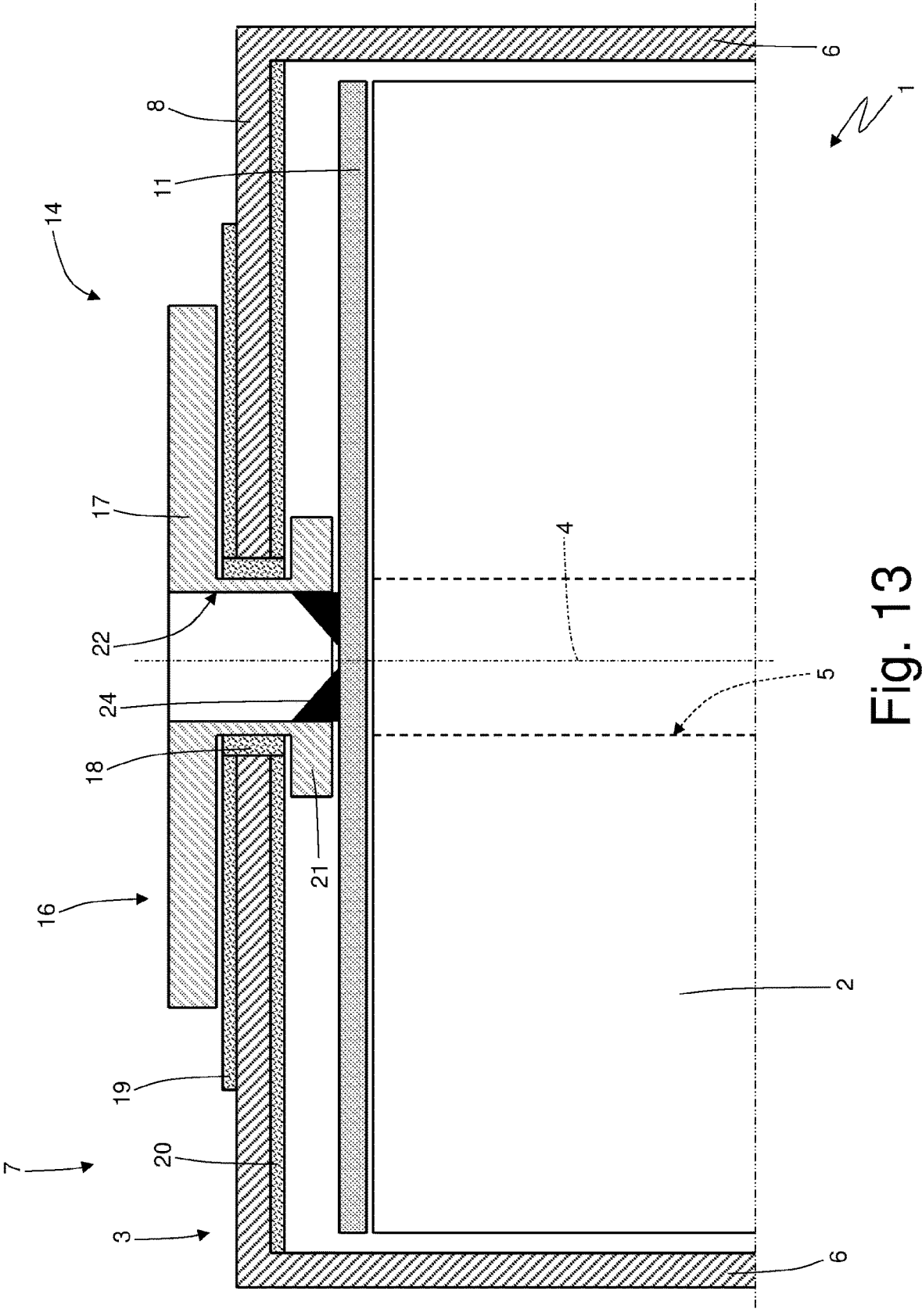
FIG. 13 is a schematic side view on an enlarged scale of a first end of a variant of the cylindrical battery of FIG. 1.

According to a different embodiment illustrated in FIG. 13, the electrical collector 11 has no protrusion 23 and the weld 24 is made between the counter-head 21 of the rivet 16 and the electrical collector 11 through the hole 22 of the rivet 16. According to a different embodiment illustrated in FIG. 14, the rivet 16 is replaced by a connection element 25 (which in the illustrated case is a ring) which has (preferably centrally) a through hole 26, which in the illustrated case has a cylindrical shape, which passes through the connection element 25 from side to side; the hole 26 of the connection element 25 is engaged by the protrusion 23 of the electrical collector 11. In particular, the hole 26 is arranged at least partially aligned (and preferably coaxial) with the hole 15 when the connection element 25 is arranged on the outer surface of the first wall 8.

In this case, the access comprises the hole 26.

Between the connection element 25 and the protrusion 23 of the electrical collector 11 there is a weld 24 which makes both a stable mechanical connection between the connection element 25 and the protrusion 23 of the electrical collector 11 and a low-resistance electrical connection between the connection element 25 and the protrusion 23 of the electrical collector 11. In this embodiment, the positive electrical pole 14 of the battery 1 consists of the connection element 25 that replaces the head 17 of the rivet 16.

Figure 14:
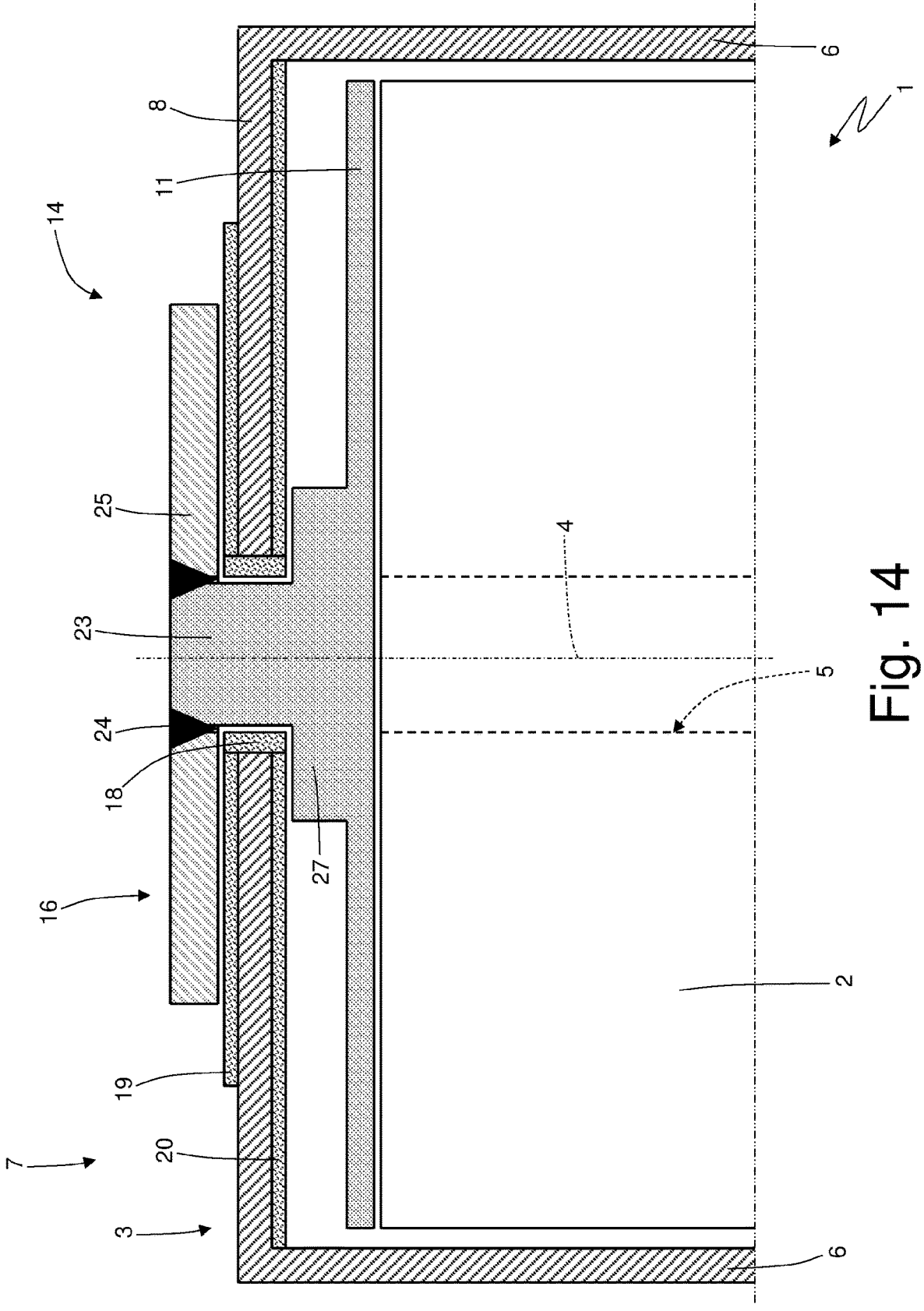
FIG. 14 is a schematic side view on an enlarged scale of a first end of a further variant of the cylindrical battery of FIG. 1.

In the embodiment illustrated in FIG. 14, the protrusion 23 of the electrical collector 11 is surrounded internally by a fixing element 27 (which in the illustrated case is a ring) having the function of compressing (and therefore keeping in place) the insulating gasket 20 against the inner surface of the first wall 8 of the container 3.

Figure 15:
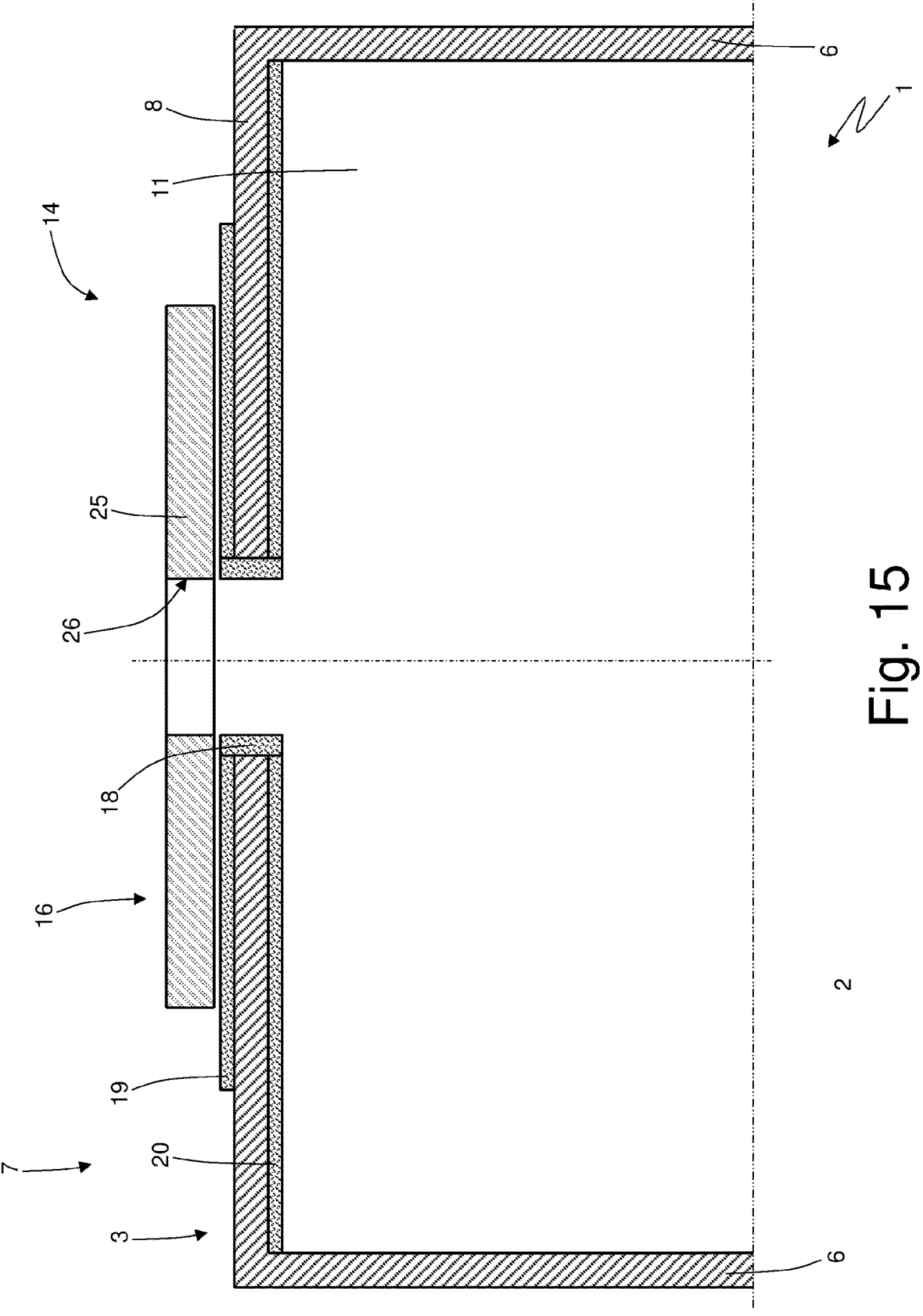
FIGS. 15 and 16 schematically illustrate a series of operations in order to make a positive pole of the cylindrical battery of FIG. 14.
Figure 16:
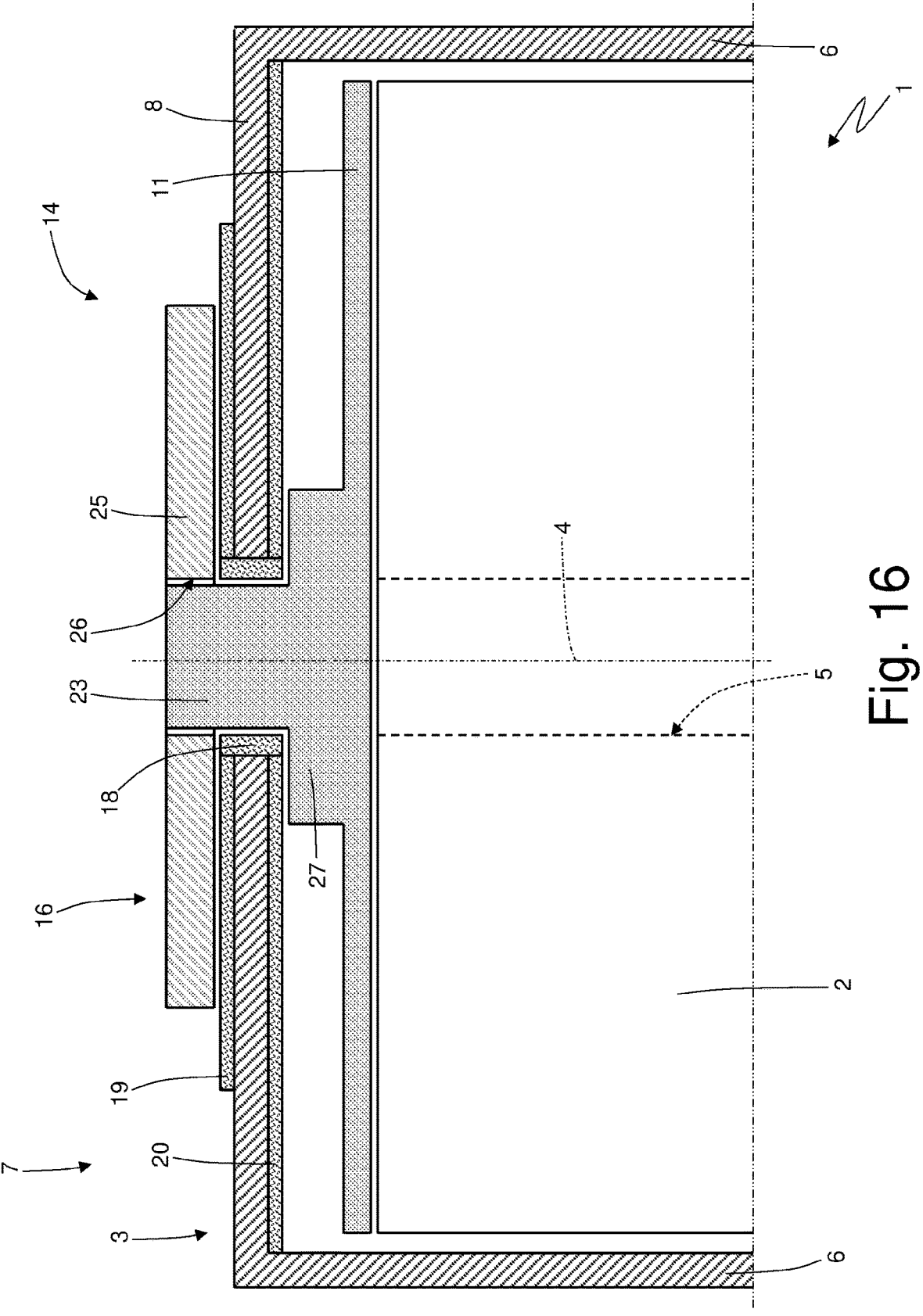

FIGS. 15 and 16 illustrate some implementation steps of the embodiment illustrated in FIG. 14 that allow to better see the shape of the connection element 25 and of the protrusion 23 of the electrical collector 11.

Figure 17:
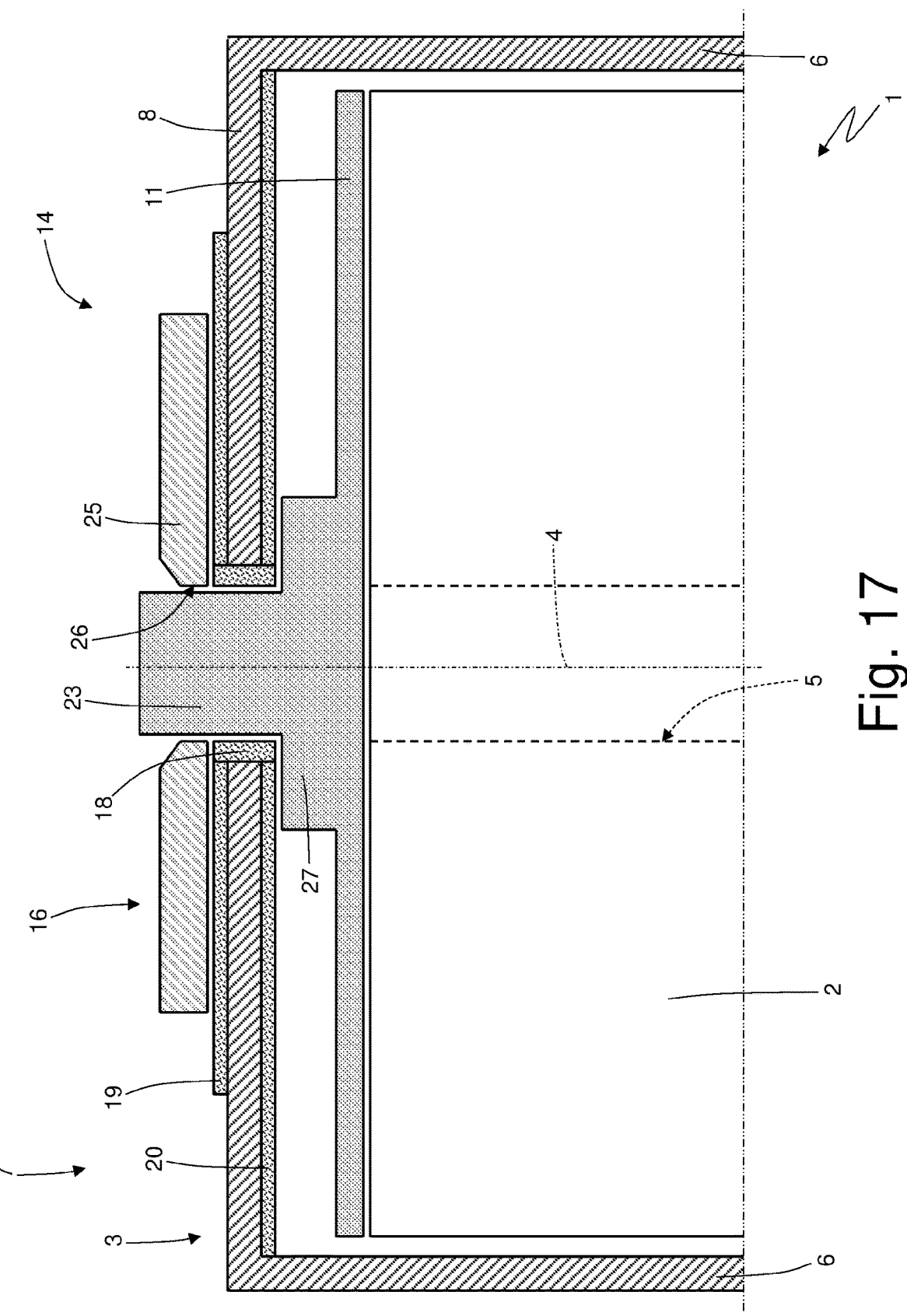
FIGS. 17 and 18 schematically illustrate a variant of some operations in order to make the positive pole of the cylindrical battery of FIG. 14.
Figure 18:
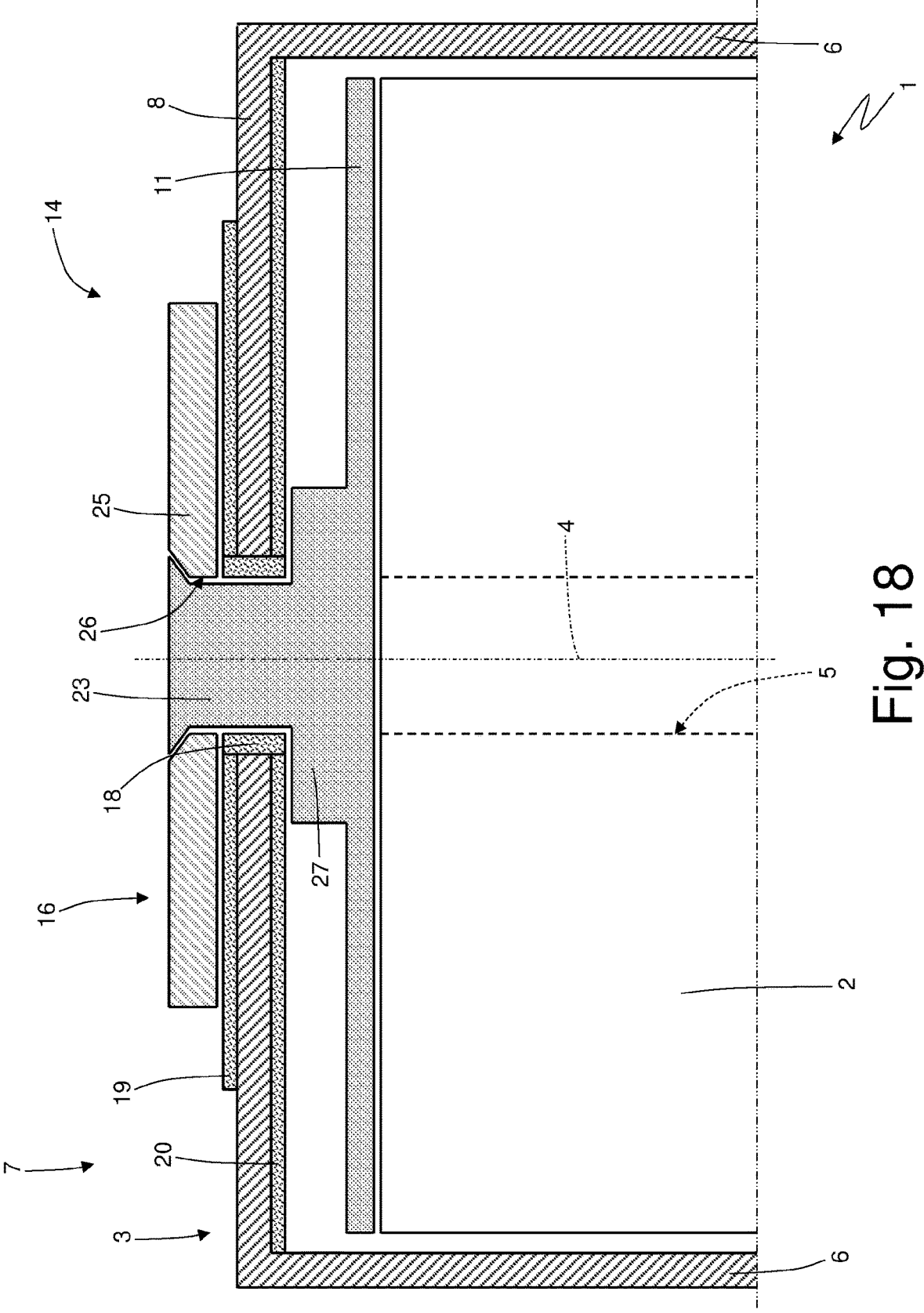

In the embodiment illustrated in FIGS. 14-16, the outer surface of the protrusion 23 of the electrical collector 11 is from the beginning coplanar to the outer surface of the connection element 25, namely it is coplanar to it once it has been inserted into the hole 26. In this embodiment, the hole 26 of the connection element 25 has a shape (which in this case is cylindrical) substantially complementary to the protrusion 23 (i.e., with no flaring) (a shape coupling is generated). According to the alternative embodiment illustrated in FIGS. 17 and 28, the outer surface of the protrusion 23 of the electrical collector 11 at first projects from the outer surface of the connection element 25, i.e. it projects therefrom once the protrusion 23 is inserted into the hole 26. In this embodiment, the hole 26 of the connection element 25 has, externally, a flaring. After having inserted the protrusion 23 of the electrical collector 11 into the hole 26 of the connection element 25, the outer part of the protrusion 23 is bucked against the connection element 25 by means of a plastic deformation so as to make the outer surface of the protrusion 23 of the electrical collector 11 coplanar to the outer surface of the connection element 25.

In all the illustrated embodiments, the hole 22 of the rivet 16 and the hole 26 of the connection element 25 are through holes, that is, the hole 22 passes through the rivet 16 from side to side and the hole 26 passes through the connection element 25 from side to side; according to a different embodiment not illustrated, the hole 22 of the rivet 16 and the hole 26 of the connection element 25 are blind as they have a (thin) upper wall that closes the holes 22 and 26 and hides the protrusion 23 of the electrical collector 11 from view.

In the embodiments illustrated in the accompanying figures, the battery 1 has a cylindrical shape and therefore consequently at least a part of the components of the battery 1 (e.g., the electrochemical cell 2 and the container 3) have a cylindrical shape (or in any case of cylindrical symmetry); according to other embodiments not illustrated, the battery 1 has a shape other than the cylindrical shape (e.g., a parallelepiped shape) and therefore at least a part of the components of the battery 1 (e.g., the electrochemical cell 2 and the container 3) have a shape other than the cylindrical shape (e.g., a parallelepiped shape). That is, the electrochemical cell 2 and the container 3 could have a prismatic shape with a circular base (and therefore be cylindrical-shaped) or they could have a prismatic shape with a rectangular or square base (and therefore be parallelepipeds). The head 17 which is arranged on the outside of the container 3 (i.e. on the outside of the first wall 8 of the container 3) and constitutes the positive electrical pole 14 of the battery 1 may have a cylindrical shape (as illustrated in the accompanying figures) or also a shape other than the cylindrical shape (for example a parallelepiped shape).

In a further embodiment not illustrated, access to the electrical collector 11 to be welded takes place exclusively through the container 3 without affecting the outer body 17, 25. In this embodiment, the first wall 8 of the container 3 comprises the hole 15 for inserting the rivet 16 and a further through hole through which a protrusion 23 of the electrical collector 11 is inserted; the weld 24 is made (from the outside) between the head 17 and the protrusion 23 of the electrical collector 11.

The energy storage battery in accordance with the previous embodiment therefore comprises: an electrochemical cell 2; an electrical collector 11 which is coupled to one end of the electrochemical cell 2; a container 3 which has a first wall 8 having a first through hole 15 and houses, on the inside, the electrochemical cell 2 so that the electrical collector 11 is arranged close to the first wall 8; a rivet 16 inserted into the first hole 15; and a further through hole on the first wall 8 of the container 3 through which a protrusion 23 of the electrical collector 11 is inserted, wherein a weld 24 is made between the head 17 of the rivet 16 and the protrusion 23 of the electrical collector 11. The embodiments described herein may be combined with each other without departing from the scope of protection of the present invention.

The production method and the battery 1 described above have numerous advantages.

Firstly, the production method and the battery 1 described above make it possible to operate at a high production speed (i.e. with a high number of cylindrical containers 3 produced per unit time) thanks to the fact that the annular weld 24 is made on the outside of the container 3 and therefore without any spatial constraint on the dimension and on the movement of the welding tools. This is possible by placing in (at least temporary) communication the electrical collector 11 with the outside of the container 3 (through the hole 15 and/or the hole 22/26) in order to be able to perform the weld 24 from the outside of the container 3.

Furthermore, the production method and the battery 1 described above make it possible to guarantee the achievement of a high quality of the end product (i.e. a reduced defectiveness); this result is obtained thanks to the fact that the weld 24 is not made inside the (i.e. from the inside of) the container 3, but is made outside the (i.e. from the outside of) the container 3; in this way, any metal debris that accidentally form while making the weld 24 do not enter inside the container 3 but remain on the outside of the container 3 and therefore cannot pollute the cylindrical electrochemical cell 2. In other words, while making the annular weld 24, splashes of molten metal can originate which, by cooling down, form small metal debris; however such small debris cannot enter the container 3 as the weld 24 is made outside the container 3. The absence of any metal debris generated by the weld 24 within the container 3 permits to substantially reduce the defectiveness of the electrochemical cell 2, since these small metal debris, if any, could give rise to small local short circuits that over time can cause a premature degradation of the electrochemical cell 2.

Furthermore, the thickness of the electrical collector 11 can be limited (i.e. the thickness of the electrical collector 11 may not be increased) to the advantage of the reduction of the height of the battery 1 as the electrical collector 11 does not have to withstand the breakthrough that may occur while making the weld 24, because the weld 24 (in the embodiment illustrated in FIGS. 2-11) does not directly affect the electrical collector 11 but affects the protrusion 23 of the electrical collector 11.

The fact that the rivet 16 has the through hole 22 (or alternatively that the connection element 25 has the through hole 26) simplifies (speeds up) the insertion of the electrochemical cell 2 into the container 3, because as the electrochemical cell 2 enters the container 3 the air present at the bottom of the container 3 that is compressed by the advancement of the electrochemical cell 2 can more effectively be vented through the through hole 22 of the rivet 16 rather than be vented through the hole 5 of the electrochemical cell 2 (as would necessarily be the case in the absence of the through hole 22 of the rivet 16).

Finally, the production method and the battery 1 described above are simple and inexpensive to implement as they do not require complex mechanical machining or the use of particular (non-standard) materials.

LIST OF REFERENCE NUMBERS OF THE FIGURES

1 battery
2 electrochemical cell
3 container
4 longitudinal axis
5 through hole
6 side wall
7 first end
8 first wall
9 second end
10 lid
11 electrical collector
12 electrical collector
13 negative electrical pole
14 positive electrical pole
15 hole
16 rivet
17 head
18 insulating gasket
19 insulating gasket
20 insulating gasket
21 counter-head
22 hole
23 protrusion
24 weld
25 connection element
26 hole
27 fixing element

The invention claimed is:
1. A production method of an energy storage battery comprising the steps of:
 providing an electrochemical cell, which is at least partially complete and provided with an electrical collector;
 providing a container having a first wall;
 placing, on an outer surface of the first wall, an outer body that constitutes an electrical pole of the battery;

inserting the electrochemical cell into the container bring-
ing the electrical collector adjacent the first wall;

providing the electrical collector with access from the
outside of the container to allow a weld between the
electrical collector and the outer body, and welding the electrical collector and the outer body to one
another at said access to establish an electrical connec-
tion, wherein said access comprises a first through hole made in the first
wall and a second hole made in the outer body and
arranged at least partially aligned with the first through
hole, when the outer body is arranged on the outer
surface of the first wall and the weld is made at the
second hole, the electrical collector has no protrusion and the weld is
made inside the second hole of the outer body.

2. The production method according to claim 1, wherein
the weld is made from the outside of the container through
the second hole and operating from the opposite side of the
first wall with respect to the electrochemical cell.

3. The production method according to claim 1, wherein
the weld is at least partially arranged inside the second hole.

4. The production method according to claim 1, wherein
the second hole is coaxial to the first hole, when the outer
body is arranged on the outer surface of the first wall.

5. The production method according to claim 1, wherein
the second hole of the outer body is a through hole.

6. The production method according to claim 1, further
comprising:

placing a first insulating gasket inside said first through
hole against an inner surface of the first wall to line the
access with the second hole;

placing a second insulating gasket between the outer body
and an outer surface of the first wall; and placing a third insulating gasket between an inner surface
of the first wall and the electrical collector.

7. An energy storage battery comprising:

an electrochemical cell, which is at least partially com-
plete and provided with an electrical collector;

a container comprising a first wall, the first wall having an
outer surface;

an outer body constituting an electrical pole of the battery
placed on the outer surface, the electrical collector comprising an access from the
outside of the container to weld the electrical collector
to the outer body to establish an electrical connection, the access comprising a first through hole made in the first
wall of the container and a second hole made in the
outer body and arranged at least partially aligned with
the first hole, when the outer body is arranged on the
outer surface of the first wall, wherein the weld is made
at the second hole, wherein the electrical collector has no protrusion and the weld is
made inside the second hole of the outer body.

8. The energy storage battery according to claim 7
wherein the weld is made from the outside of the container
through the second hole and operates from the opposite side
of the first wall with respect to the electrochemical cell.

9. The energy storage battery according to claim 7,
wherein the weld is at least partially arranged inside the
second hole.

10. The energy storage battery according to claim 7,
wherein the second hole is coaxial to the first hole, when the
outer body is arranged on the outer surface of the first wall.

11. The energy storage battery according to claim 7,
wherein the second hole of the outer body is a through hole.

12. The energy storage battery according to claim 7,
wherein:

the electrical collector comprises a protrusion, which is
inserted into the first hole of the first wall and into the
second hole of the outer body; and the weld is made between the outer body and the protru-
sion of the electrical collector.

* * * * *